(No Model.)
I. N. HAMILTON.
SPLIT PULLEY.
No. 535,583. Patented Mar. 12, 1895.
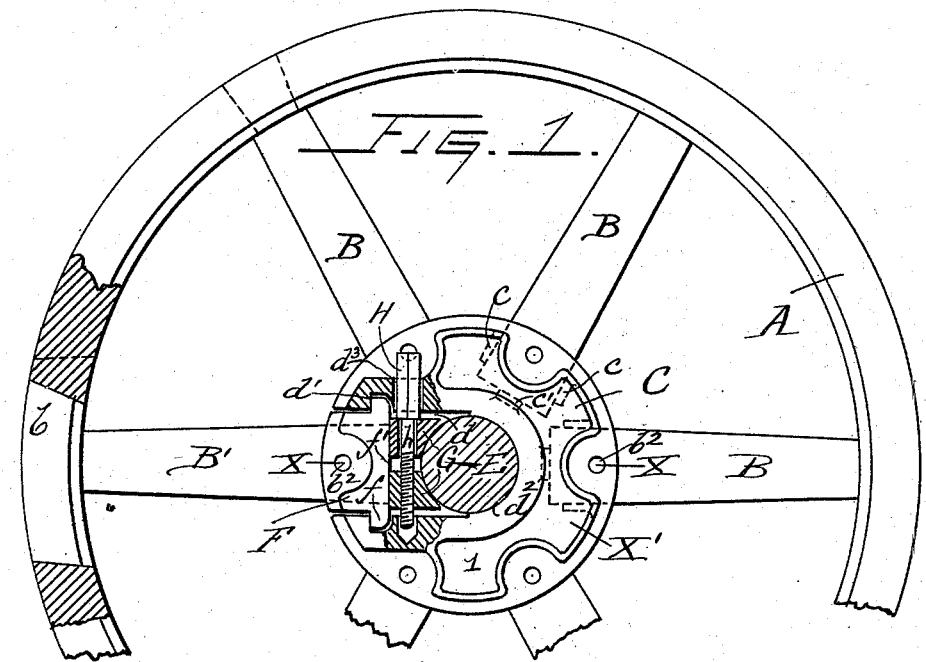
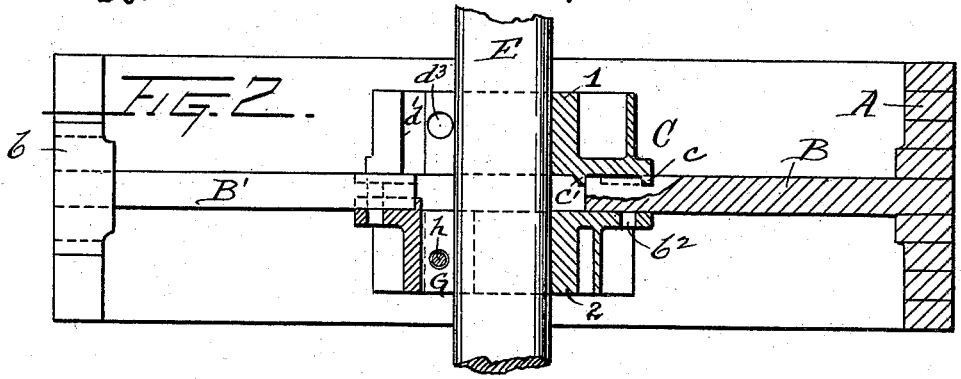
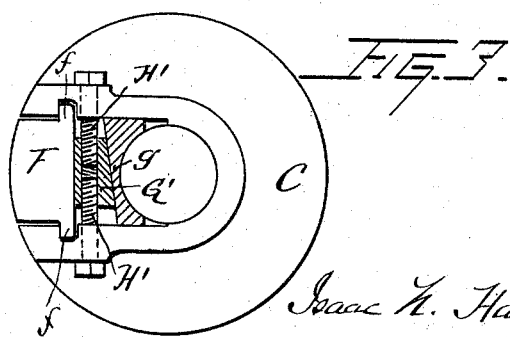

UNITED STATES PATENT OFFICE.

ISAAC N. HAMILTON, OF READING, PENNSYLVANIA.

SPLIT PULLEY.

SPECIFICATION forming part of Letters Patent No. 535,583, dated March 12, 1895.

Application filed September 14, 1894. Serial No. 523,006. (No model.)

*To all whom it may concern:*

Be it known that I, ISAAC N. HAMILTON, a citizen of the United States, residing at Reading, county of Berks, State of Pennsylvania, have invented certain Improvements in Split Pulleys, of which the following is a specification.

My invention relates to split pulleys and more particularly to that class in which the rim and hub have removable sections sufficiently large to form a radial opening from the center outward through the periphery of the pulley, for the admission of a shaft.

The invention consists in the improved hub construction and its connection to the rim, and also in the improved means of clamping the pulley to the shaft.

Figure 1 is a side elevation, partly in section, of a pulley embodying my invention. Fig. 2. is a cross section of the same showing one of the main hub sections on the line $x\ x$ and the other on the line $x\ x'$ of Fig. 1 and with one of the wedges and removable hub sections removed. Fig. 3. shows a modified clamping mechanism.

The rim A of the pulley is continuous, except for the small removable section $b$, which when removed gives sufficient opening to permit the passage of the shaft E. The hub is similarly formed of a main section C having openings $d$ from the center outward, and removable sections F. The main section C is divided into two half sections, 1, 2, between which the ends of the spokes are placed.

The main portion of the rim A is connected with the main hub sections C by means of spokes B B, the inner ends of which are socketed in pockets formed between the two half sections 1, 2, by flanges $c\ c'$ and are bolted to said sections at $b^2$. The removable section $b$ of the rim is dovetailed into or otherwise suitably attached to the main portion so as to bind the whole together when in place, and is connected by a spoke B′ to the removable hub sections F in the same manner as the other spokes are connected to the main hub section C; and the hub sections F, are connected to the main hub sections by means of flanges or projections $f$ which are slidable into or out of engagement with shoulders $d'$ formed in the hub opening $d$.

Between the face $f'$ of the removable hub section F and the shaft E, I allow sufficient space for the location of a clamping mechanism for securing the pulley to the shaft. This I preferably form as shown in Fig. 1 in which G G represent two similar wedge-shaped blocks, having concave faces in contact with the surface of the shaft and opposite flat faces bearing against the hub section F. One of these blocks is provided with a screw threaded hole adapted to fit the threaded end of a transverse bolt H. The body $h$ of this bolt passes loosely through a hole in the other block and its head bears against the outer face of the same block and passes loosely through an opening $d^3$ in the wall of the main hub section C, so as to allow it to be conveniently turned by a suitable wrench to effect the drawing together of the wedge-shaped blocks for the purpose of tightening the pulley, or releasing them to loosen it.

In the construction herein shown two sets of clamping means are employed. Each set consists of a pair of blocks and a bolt H said sets being arranged as indicated in Fig. 2.

In order to remove the rim section $b$, preparatory to placing the pulley upon a shaft, the bolt $b^2$ through the removable hub section F and spoke B′ is taken out, which permits the withdrawal of the rim section and also of the hub section F. The wedge blocks are removed by first taking out the screw bolt H. When the pulley is in place the operation is merely reversed. In tightening the pulley the screw and wedge combined enable great pressure to be brought upon the shaft, thus insuring a far more secure fastening than is possible by means of a set screw and without marring the surface of the shaft. The strain is taken directly by the removable hub section F which in turn conveys it to the main hub section through the flanges $f$ and shoulders or offsets $d'$.

In Fig. 3 I have illustrated a modified clamping mechanism in which a single wedge block G′ is employed. This presses against the hub section F as before and upon a half bushing $g$ in contact with the shaft, and the transverse movement of the block is effected by means of two similar screws H′ H′ entering the tapped block through the opposite walls of the hub, the blocks being thus readily moved and locked as desired.

Having thus fully described my invention, I do not desire to limit myself to the exact construction shown, but

What I claim is—

1. A split pulley, comprising a main portion of the rim; radial spokes; the divided hub having an opening $d$ to admit the shaft radially, and also having pockets into which the inner ends of the spokes are set; the divided removable hub-section received by said opening $d$; the removable rim section; the spoke connecting said removable hub and rim sections; and the clamp engaging the inner face of said removable hub section.

2. A split pulley, embracing a hub, consisting of a main section divided into two half-sections, having flanges $c$ $c'$ and shoulders $d'$, said flanges forming pockets, and a section which is removable to permit the shaft to be introduced laterally, said removable section having flanges engaging said shoulder $d'$; the main portion of the rim; radial spokes, the inner ends of which are received by said pockets and engaged by said flanges; the removable rim section; the spoke connecting said removable hub and rim-sections; and clamping devices engaging said removable hub section.

3. In a split pulley, the combination with a hub consisting of a main section having an opening to admit the shaft radially and removable sections formed with flanges $f$ arranged to engage shoulders $d'$ on the main section, of wedge shaped blocks located in said opening between said removable hub section and the shaft, and means for moving said blocks to clamp or release the shaft, substantially as set forth.

4. In a split pulley, the combination, with the hub having a section F and a space between said section and the shaft, of wedge shaped blocks C G located between said section and the shaft, and a screw bolt having the threaded end thereof engaging a threaded hole in one of said blocks with the body passing loosely through a hole in the second block and the head bearing against the face of the latter, substantially as set forth.

In testimony whereof I affix my signature in presence of two witnesses.

ISAAC N. HAMILTON.

Witnesses:
W. G. STEWART,
ADAM L. OTTERBEIN.